US011118051B2

(12) United States Patent
Kim et al.

(10) Patent No.: US 11,118,051 B2
(45) Date of Patent: Sep. 14, 2021

(54) POLY(LACTIC ACID) RESIN COMPOSITION AND MOLDED PRODUCT COMPRISING SAME

(71) Applicant: SK CHEMICALS CO., LTD., Seongnam-si (KR)

(72) Inventors: Min-young Kim, Seoul (KR); Tae-Young Kim, Suwon-si (KR); Jeoung-Jun Hwang, Anyang-si (KR); Jae-il Chung, Seongnam-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 245 days.

(21) Appl. No.: 16/081,998

(22) PCT Filed: Jan. 24, 2017

(86) PCT No.: PCT/KR2017/000819
§ 371 (c)(1),
(2) Date: Sep. 4, 2018

(87) PCT Pub. No.: WO2017/164504
PCT Pub. Date: Sep. 28, 2017

(65) Prior Publication Data
US 2020/0283622 A1    Sep. 10, 2020

(30) Foreign Application Priority Data
Mar. 24, 2016  (KR) .......................... 10-2016-0035223

(51) Int. Cl.
*C08L 67/04*  (2006.01)
*B29C 45/00*  (2006.01)
*B29C 45/72*  (2006.01)
*B29K 67/00*  (2006.01)
*B29K 509/02* (2006.01)

(52) U.S. Cl.
CPC .......... *C08L 67/04* (2013.01); *B29C 45/0001* (2013.01); *B29C 45/7207* (2013.01); *B29K 2067/046* (2013.01); *B29K 2509/02* (2013.01); *B29K 2995/0077* (2013.01); *B29K 2995/0089* (2013.01); *C08L 2205/025* (2013.01)

(58) Field of Classification Search
CPC ............... C08L 67/04; C08L 2205/025; B29C 45/0001; B29C 45/7207; B29K 2995/0077; B29K 2995/0089; B29K 2067/046; B29K 2509/02
USPC ........................................................ 524/791
See application file for complete search history.

(56) References Cited

U.S. PATENT DOCUMENTS

| 9,499,658 B2* | 11/2016 | Yoo .................... C08G 63/664 |
| 2014/0004330 A1* | 1/2014 | Yoo ........................ C08G 18/48 428/220 |
| 2014/0037931 A1* | 2/2014 | Yoo ......................... C08L 75/06 428/220 |
| 2014/0235777 A1 | 8/2014 | Noordegraaf et al. |
| 2014/0363598 A1* | 12/2014 | Hoekstra ................ B65D 1/265 428/35.7 |
| 2015/0376373 A1* | 12/2015 | Shoji ........................ C08K 5/29 525/450 |

FOREIGN PATENT DOCUMENTS

| EP | 2639255 A2 | 9/2013 |
| EP | 2816086 A1 | 12/2014 |
| KR | 10-2011-0004631 A | 1/2011 |
| KR | 10-2011-0054400 A | 5/2011 |
| KR | 10-1191967 B1 | 10/2012 |
| KR | 10-2013-0135758 A | 12/2013 |
| KR | 10-2015-0040646 A | 4/2015 |

* cited by examiner

*Primary Examiner* — Michael Bernshteyn
(74) *Attorney, Agent, or Firm* — Sughrue Mion, PLLC

(57) ABSTRACT

The present invention relates to a polylactic acid resin composition and a molded product using same. Since the polylactic acid resin composition according to the present invention has excellent environmental friendliness and biodegradability, has excellent heat resistance characteristics due to high heat deformation temperature (HDT), and may be injection molded within a commercially reasonable cycle time due to high crystallinity and crystallization rate, it is suitable for the preparation of a molded product.

13 Claims, No Drawings

POLY(LACTIC ACID) RESIN COMPOSITION AND MOLDED PRODUCT COMPRISING SAME

CROSS REFERENCE TO RELATED APPLICATIONS

This application is a National Stage of International Application No. PCT/KR2017/000819 filed Jan. 24, 2017, claiming priority based on Korean Patent Application No. 10-2016-0035223 filed Mar. 24, 2016.

TECHNICAL FIELD

The present invention relates to a polylactic acid resin composition and a molded product comprising same.

BACKGROUND ART

Crude oil-based resins, such as polyethylene terephthalate (PET), nylon, polyolefin, or flexible polyvinyl chloride (PVC), have been widely used as a material for various applications such as a packaging material. However, since the crude oil-based resins are not biodegradable, they may cause environmental pollution upon disposal thereof, for example, by emitting a large amount of carbon dioxide which is a global warming gas. Also, the potential use of a polylactic acid resin as a biomass-based biodegradable resin, is being widely reviewed as oil resources are gradually depleted.

However, when a polylactic acid resin is used for injection molding application, the productivity of the process may be reduced due to low crystallinity and slow crystallization of the polylactic acid resin itself since such properties decrease heat resistance (heat deformation temperature (HDT): 55° C.) and increase cooling time required for extraction from a mold which cause to increase the entire cycle time.

In order to address the limitation as described above, a method has been known in which the HDT is increased to 100° C. or more by maximizing crystallization through the introduction of a poly-D-lactic acid (PDLA) resin as a nucleating agent into the polylactic acid resin. Even though such method is applied, since the crystallization rate is still low for commercial applications, the cycle time is increased during injection molding.

To address this issue, the crystallization rate has been increased by introducing a nucleating agent and a plasticizer into the polylactic acid resin, but bleed-out of the plasticizer from an injection-molded article occurs and a desired fast crystallization effect is not achieved.

Thus, as an alternative, a copolymerized polylactic acid (PLA), in which a flexible component is introduced into a PLA molecular structure, has recently been proposed (see Korean Patent Application Laid-open Publication No. 2013-0135758). In particular, with respect to a PLA copolymer into which a polyurethane polyol repeating unit is introduced, since desired flexibility may be secured without a decrease in molecular weight and the bleed-out of the plasticizer due to the introduction of the flexible component, the PLA copolymer has been recognized for its technical or commercial value.

Since the flexible PLA copolymer having a polyurethane polyol repeating unit includes a soft segment acting as a plasticizer within itself, crystallization rate is faster than that of a conventional general PLA resin, but there is still a need to develop a PLA resin having higher crystallinity and faster crystallization rate in order to commercially use the PLA resin for injection molding application.

DISCLOSURE OF INVENTION

Technical Problem

Thus, an object of the present invention is to provide a polylactic acid resin composition exhibiting excellent heat resistance due to high heat deformation temperature (HDT) and commercially useful for injection molding due to high crystallinity and crystallization rate. Also, an object of the present invention is to provide a molded product including the polylactic acid resin composition.

Solution to Problem

To achieve the above objects, the present invention provides a polylactic acid resin composition comprising a polylactic acid resin which includes a hard segment including a polylactic acid repeating unit represented by Formula 1, and a soft segment including a polyurethane polyol repeating unit in which polyether-based polyol repeating units represented by Formula 2 are linearly linked via a urethane bond; a poly-D-lactic acid (PDLA) resin as a nucleating agent; and talc:

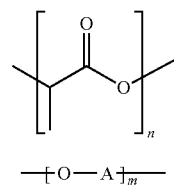

[Formula 1]

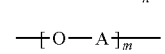

[Formula 2]

wherein, in Formula 1, n is an integer of 700 to 5,000; and in Formula 2, A is a linear or branched alkylene group having 2 to 5 carbon atoms, and m is an integer of 10 to 100.

Further, the present invention provides a molded product including the polylactic acid resin composition.

Advantageous Effects of Invention

Since a polylactic acid resin composition according to the present invention has excellent environmental friendliness and biodegradability, exhibits excellent heat resistance characteristics due to high heat deformation temperature (HDT), and may be injection molded within a commercially reasonable cycle time due to high crystallinity and crystallization rate, it is suitable for the preparation of a molded product.

BEST MODE FOR CARRYING OUT THE INVENTION

Hereinafter, the present invention will be described in detail.

Polylactic Acid Resin

A polylactic acid resin composition according to the present invention comprises a polylactic acid resin which includes a hard segment including a polylactic acid repeating unit represented by the following Formula 1 and a soft segment including a polyurethane polyol repeating unit in which polyether-based polyol repeating units represented by the following Formula 2 are linearly linked via a urethane bond, a poly-D-lactic acid (PDLA) resin as a nucleating agent, and talc:

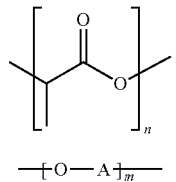
[Formula 1]

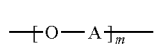
[Formula 2]

wherein, in Formula 1, n is an integer of 700 to 5,000; and in Formula 2, A is a linear or branched alkylene group having 2 to 5 carbon atoms, and m is an integer of 10 to 100.

The polylactic acid resin includes a hard segment including a polylactic acid repeating unit represented by the following Formula 1, and a soft segment including a polyurethane polyol repeating unit in which polyether-based polyol repeating units represented by the following Formula 2 are linearly linked via a urethane bond (—C(=O)—NH—). The polylactic acid resin may be a block copolymer including the hard segment and the soft segment. Specifically, the polylactic acid resin is a block copolymer in which a terminal carboxyl group of the polylactic acid repeating unit included in the hard segment and a terminal hydroxyl group of the polyurethane polyol repeating unit are linked via an ester bond.

In the polylactic acid resin according to an embodiment of the present invention, the polylactic acid repeating unit of Formula 1 included in the hard segment may be a poly-L-lactic acid repeating unit (see the following Formula 1a), a poly-D-lactic acid repeating unit (see the following Formula 1b), or a repeating unit in which these are copolymerized. Specifically, the polylactic acid repeating unit of Formula 1 may be a poly-L-lactic acid repeating unit.

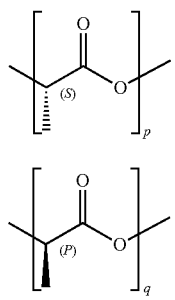
[Formula 1a]

[Formula 1b]

wherein, in Formula 1a and 1b, p and q are integers of 1 or more which represent the number of repeating units.

The poly-L-lactic acid repeating unit may be derived from L-lactide or L-lactic acid of the following Formula 3a, and the poly-D-lactic acid repeating unit may be derived from D-lactide or D-lactic acid of the following Formula 3b.

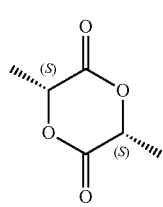
[Formula 3a]

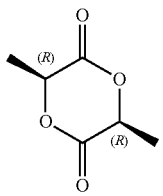
[Formula 3b]

The polylactic acid repeating unit, in which the poly-L-lactic acid repeating unit and the poly-D-lactic acid repeating unit are copolymerized, for example, may be a atactic or heterotactic copolymerized repeating unit in which special stereoregularity or tacticity is absent.

The polylactic acid resin of the present invention may have biomass-based resin-specific biodegradability by basically including the polylactic acid repeating unit as the hard segment, and, the flexibility of an article obtained from the polylactic acid resin may simultaneously be significantly improved by including the polyurethane polyol repeating unit as the soft segment. Also, since the hard segment and the soft segment are combined into a block copolymer, a phenomenon of bleed-out of the soft segment may be minimized, and a decrease in moisture resistance, mechanical properties, heat resistance, transparency, or haze characteristics of the article obtained from the resin may be significantly reduced by the addition of the soft segment.

The polylactic acid resin according to the embodiment of the present invention may include 65 wt % to 95 wt % of the above-described hard segment and 5 wt % to 35 wt % of the soft segment, particularly 80 wt % to 95 wt % of the hard segment and 5 wt % to 20 wt % of the soft segment, and more particularly 82 wt % to 94 wt % of the hard segment and 6 wt % to 18 wt % of the soft segment, based on a total weight of the polylactic acid resin.

When the amount of the hard segment is within the above range, the molecular weight properties of the polylactic acid resin may be better (for example, relatively high molecular weight and narrow molecular weight distribution may be obtained), and mechanical properties of the molded product thus obtained may be better. Simultaneously, when the amount of the soft segment is within the above range, flexibility of the polylactic acid resin may be secured during injection molding and, since the polyurethane polyol repeating unit sufficiently plays a role as a polymerization initiator, excellent molecular weight property may be exhibited.

The polyurethane polyol repeating unit included in the soft segment has a structure in which the polyether-based polyol repeating units of Formula 2 are linearly linked via a urethane bond (—C(=O)—NH—). Specifically, the polyether-based polyol repeating units are obtained by ring-opening (co)polymerization of monomers such as alkylene oxide, wherein the polyether-based polyol repeating unit has a terminal hydroxyl group. The terminal hydroxyl group as described above may be reacted with an isocyanate group of a diisocyanate compound to form a urethane bond, and the polyether-based polyol repeating units may be linearly linked to each other via the urethane bond to form the polyurethane polyol repeating unit.

The polyether-based polyol repeating unit and the diisocyanate compound may be reacted so that a molar ratio of the terminal hydroxyl group of the polyether-based polyol repeating unit to the isocyanate group of the diisocyanate compound is in a range of 1:0.50 to 1:0.99, and, thus, the polyurethane polyol repeating unit may be formed. Specifically, the molar ratio may be in a range of 1:0.60 to 1:0.90, for example, 1:0.70 to 1:0.85.

The polyether-based polyol repeating unit, for example, may be a repeating unit of a polyether-based polyol (co) polymer obtained by the ring-opening (co)polymerization of at least one alkylene oxide. Examples of the alkylene oxide may be ethylene oxide, propylene oxide, butylene oxide, or tetrahydrofuran.

Examples of the polyether-based polyol repeating unit obtained therefrom may be a repeating unit of polyethylene glycol (PEG); a repeating unit of poly(1,2-propylene glycol); a repeating unit of poly(1,3-propanediol); a repeating unit of polytetramethylene glycol; a repeating unit of polybutylene glycol; a repeating unit of a polyol copolymerized from propylene oxide and tetrahydrofuran; a repeating unit of a polyol copolymerized from ethylene oxide and tetrahydrofuran; or a repeating unit of a polyol copolymerized from ethylene oxide and propylene oxide.

In consideration of provision of flexibility to the polylactic acid resin article, affinity to the polylactic acid repeating unit, and moisture-retention properties, a repeating unit of poly(1,3-propanediol) or a repeating unit of polytetramethylene glycol may be used as the polyether-based polyol repeating unit.

Also, the polyether-based polyol repeating unit may have a number-average molecular weight (Mn) of 1,000 to 100,000, for example, 10,000 to 50,000. If the molecular weight of the polyether-based polyol repeating unit is excessively large or small, the molecular weight property of the polylactic acid resin may be deteriorated and, thus, flexibility, mechanical properties, and heat resistance of the article obtained from the polylactic acid resin may be reduced.

In addition, the diisocyanate compound, which may form a urethane bond by being bonded to the terminal hydroxyl group of the polyether-based polyol repeating unit, may be an arbitrary compound having two isocyanate groups in the molecule.

Examples of the diisocyanate compound may be 1,6-hexamethylene diisocyanate, 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-bisphenylene diisocyanate, hexamethylene diisocyanate, isophorone diisocyanate, or hydrogenated diphenylmethane diisocyanate. In addition, various other diisocyanate compounds well known to those skilled in the art may be used without any limitation.

The polylactic acid resin may be included in an amount of 60 wt % to 95 wt %, for example, 80 wt % to 95 wt %, based on a total weight of the polylactic acid resin composition. When the amount of the polylactic acid resin is within the above range, heat deformation temperature and crystallinity may be improved while not reducing mechanical properties, heat resistance, blocking resistance, and transparency of the polylactic acid resin composition including the polylactic acid resin.

Nucleating Agent

The polylactic acid resin composition according to the present invention comprises a poly-D-lactic acid (PDLA) resin and talc as a nucleating agent.

The poly-D-lactic acid resin may have a weight-average molecular weight (Mw) of 100,000 to 400,000, for example, 100,000 to 320,000.

The poly-D-lactic acid resin may be included in an amount of 1 wt % to 20 wt %, for example, 1 wt % to 10 wt %, based on the total weight of the polylactic acid resin composition. When the weight-average molecular weight (Mw) and the amount of the poly-D-lactic acid resin are within the above ranges, the heat resistance and crystallinity of the polylactic acid resin composition may be further improved.

The talc may have an average particle diameter of 0.5 μm to 2.5 μm, for example, 0.5 μm to 1.5 μm.

The talc may be included in an amount of 1 wt % to 20 wt %, for example, 1 wt % to 15 wt %, based on the total weight of the polylactic acid resin composition. When the amount of the talc is within the above range, the crystallinity of the polylactic acid resin composition may be further improved.

Additional Components

It is not necessary for all of the polylactic acid repeating units included in the polylactic acid resin composition to have a configuration of the block copolymer bonded to the polyurethane polyol repeating unit, and at least some of the polylactic acid repeating units may have a configuration of a polylactic acid resin which is not bonded to the polyurethane polyol repeating unit. In this case, the polylactic acid resin composition may include the above-described block copolymer and a single polylactic acid resin which is not bonded to the polyurethane polyol repeating unit.

The polylactic acid resin composition may further include a phosphorus-based stabilizer and/or an antioxidant in order to suppress oxidation or thermal decomposition of the soft segment in the preparation process thereof.

Each of the phosphorus-based stabilizer and the antioxidant may be appropriately selected from those typically used in the art. Examples of the antioxidant may be a hindered phenol-based antioxidant, an amine-based antioxidant, a thio-based antioxidant, or a phosphite-based antioxidant.

In addition to the stabilizer and antioxidant, the polylactic acid resin composition may further include various additives, such as a plasticizer, an ultraviolet stabilizer, a color blocking agent, an anti-gloss agent, a deodorant, a flame retardant, an anti-weathering agent, an anti-static agent, a releasing agent, an oxidation inhibitor, an ion exchanger, a coloring pigment, and inorganic or organic particles, in such an amount so as not to have negative influences on the physical properties of the resin.

Examples of the plasticizer may be phthalic acid ester plasticizers such as phthalic acid diethyl, phthalic acid dioctyl, and phthalic acid dicyclohexyl; aliphatic dibasic acid ester plasticizers such as adipic acid di-1-butyl, adipic acid di-n-octyl, sebacic acid di-n-butyl, and azelaic acid di-2-ethyl hexyl; phosphoric acid ester plasticizers such as phosphoric acid diphenyl-2-ethyl hexyl and phosphoric acid diphenyl octyl; polyhydroxy carboxylic acid ester plasticizers such as acetyl citric acid tributyl, acetyl citric acid tri-2-ethyl hexyl, and citric acid tributyl; aliphatic ester plasticizers such as acetyl ricinoleic acid methyl and stearic acid amyl; polyhydric alcohol ester plasticizers such as glycerin triacetate; or epoxy plasticizers such as epoxylated soybean oil, epoxylated flaxseed oil fatty acid butyl ester, and epoxylated stearic acid octyl.

Furthermore, examples of the coloring pigment may be inorganic pigments such as carbon black, titanium oxide, zinc oxide, and iron oxide; or organic pigments such as cyanines, phosphorous, quinines, perinones, isoindolinones, and thioindigos.

Physical Properties

The polylactic acid resin (block copolymer) according to the present invention may have a considerably narrow molecular weight distribution as well as a relatively large molecular weight.

The polylactic acid resin may have a number-average molecular weight (Mn) of 50,000 to 200,000, for example, 50,000 to 150,000, and may have a weight-average molecular weight (Mw) of 100,000 to 400,000, for example, 100,000 to 320,000. When the Mn and Mw are within the above ranges, the mechanical properties of the article obtained from the raw material resin may be better.

Also, the polylactic acid resin may have a molecular weight distribution (Mw/Mn), which is defined as a ratio of the Mw to the Mn, of 1.60 to 2.30, for example, 1.80 to 2.20. When the molecular weight distribution is within the above range, the raw material resin may be easily injection molded, and a molded product obtained therefrom may exhibit excellent mechanical properties.

The polylactic acid resin may have a glass transition temperature (Tg) of 20° C. to 80° C., for example, 30° C. to 70° C. Flexibility or stiffness of a molded product molded from the polylactic acid resin having the above Tg range may be optimized.

Furthermore, the polylactic acid resin may have a melting temperature (Tm) of 150° C. to 180° C., for example, 160° C. to 180° C. When the Tm is within the above range, processing characteristics and heat resistance of the raw material resin may be further improved.

Also, the polylactic acid resin composition including the polylactic acid resin and the nucleating agent (poly-D-lactic acid resin, talc) may have a heat deformation temperature (HDT) of 100° C. or more.

The present invention provides a molded product including the polylactic acid resin composition. In particular, the polylactic acid resin composition may be suitable for the preparation of an injection-molded product.

Furthermore, the molded product including the polylactic acid resin composition may be prepared by a series of processes including an injection molding process.

Specifically, the polylactic acid resin composition may be automatically injection molded by being cooled at a temperature of 100° C. to 150° C. for 10 seconds to 35 seconds, and a molded product thus prepared may have a heat deformation temperature (HDT) of 100° C. to 150° C.

As described above, since the polylactic acid resin composition according to the present invention has excellent environmental friendliness and biodegradability, exhibits excellent heat resistance characteristics due to high heat deformation temperature (HDT), and may be injection molded within a commercially reasonable cycle time due to high crystallinity and crystallization rate, it is suitable for the preparation of the molded product.

Preparation Method

A method of preparing the polylactic acid resin in the polylactic acid resin composition according to the present invention is as follows.

Method of Preparing Polylactic Acid Resin (Block Copolymer)

The polylactic acid resin may be prepared by a method including the steps of: ring-opening (co)polymerizing at least one monomer, such as alkylene oxide, to form a (co)polymer having a polyether-based polyol repeating unit; reacting the (co)polymer with a diisocyanate compound in the presence of a catalyst to form a (co)polymer having a polyurethane polyol repeating unit; and polycondensing a lactic acid (D-lactic acid or L-lactic acid) or ring-opening polymerizing a lactide (D-lactide or L-lactide) in the presence of the (co)polymer having a polyurethane polyol repeating unit.

Hereinafter, the method of preparing the polylactic acid resin of the present invention will be described in more detail.

First, a (co)polymer having a polyether-based polyol repeating unit is prepared by ring-opening (co)polymerization of at least one monomer such as alkylene oxide, wherein this may be performed according to a typical method of preparing a polyether-based polyol (co)polymer.

Thereafter, the (co)polymer having a polyether-based polyol repeating unit, a diisocyanate compound, and a urethane reaction catalyst are loaded into a reactor, and subjected to a urethane reaction while heating and stirring. By this reaction, two isocyanate groups of the diisocyanate compound and terminal hydroxyl groups of the (co)polymer are combined to form urethane bonds. As a result, a (co)polymer having a polyurethane polyol repeating unit in a configuration, in which the polyether-based polyol repeating units are linearly linked via a urethane bond, may be formed, and this is included as a soft segment of the above-described polylactic acid resin.

The urethane reaction may be performed in the presence of a conventional tin (Sn)-based catalyst, for example, stannous octoate (tin(II) 2-ethylhexanoate), dibutyltin dilaurate, or dioctyltin dilaurate. Also, the urethane reaction may be performed under typical reaction conditions for the preparation of a polyurethane resin. For example, the diisocyanate compound and the polyether-based polyol (co)polymer are added in a nitrogen atmosphere, and the reaction may then be performed at a reaction temperature of 70° C. to 80° C. for 1 hour to 5 hours by adding a urethane reaction catalyst to prepare a (co)polymer having a polyurethane polyol repeating unit.

Subsequently, while a polylactic acid repeating unit is formed when polycondensation of a lactic acid (D- or L-lactic acid) or ring-opening polymerization of a lactide (D- or L-lactide) is performed in the presence of the (co)polymer having a polyurethane polyol repeating unit, a polylactic acid resin block copolymer including the polylactic acid repeating unit and the polyurethane polyol repeating unit respectively as a hard segment and a soft segment may be prepared.

The ring-opening polymerization of the lactide may be performed in the presence of a metal catalyst including an alkaline earth metal, a rare earth metal, a transition metal, aluminum, germanium, tin, or antimony. Specifically, the metal catalyst may be in the form of carboxylic acid salts, alkoxides, halides, oxides, or carbonates of these metals. For example, stannous octoate, titanium tetraisopropoxide, or aluminum triisopropoxide may be used as the metal catalyst.

A polylactic acid resin composition may be formed by mixing the polylactic acid resin prepared as described above with a nucleating agent. Specifically, a polylactic acid resin composition may be formed by mixing the polylactic acid resin with a nucleating agent and compounding the mixture in an apparatus, such as a twin-screw extruder, at 180° C. to 200° C.

MODE FOR THE INVENTION

Examples

Hereinafter, the present invention is explained in more detail by Examples. The following Examples are intended to further illustrate the present invention without limiting its scope.

[Raw Materials]

Resin A (flexible PLA resin): f-PLLA, SK Chemicals

Resin B (General PLLA resin): PLA 3251D, NatureWorks LLC

Resin C (first nucleating agent: PDLA resin): 6 g of 1-dodecanol and 4 kg of D-lactide were added to a 8 l reactor equipped with a nitrogen gas inlet tube, a stirrer, a catalyst inlet, an outflow condenser, and a vacuum system, and nitrogen flushing was performed five times. The D-lactide was completely dissolved by increasing the temperature of the mixture to 150° C., and 120 ppmw of tin(II) 2-ethylhexanoate, as a catalyst, was distilled in 500 ml of toluene and added into the reactor through the catalyst inlet. Subsequently, the reaction was performed at 185° C. for 2 hours under a nitrogen gas pressure of 1 kg, 200 ppmw of phosphoric acid was added through the catalyst inlet, and mixing was then performed for 15 minutes to inactivate the residual catalyst. Resin C (PDLA resin) was obtained by removing the unreacted D-lactide through a vacuum reaction until the pressure leached 0.5 torr.

Talc (second nucleating agent): average particle diameter of 1.0 μm

Glass transition temperature (Tg), melting temperature (Tm), number-average molecular weight (Mn), and weight-average molecular weight (Mw) were measured for Resins A, B, and C by the following methods, and the results thereof are presented in Table 1 below.

(1) Weight-Average Molecular Weight (Mw) and Number-Average Molecular Weight (Mn)

A polylactic acid resin was dissolved at a concentration of 0.25 wt % in chloroform, Mw and Mn were measured by gel permeation chromatography (manufactured by Viscotek TDA 305, Column: Shodex LF804*2ea), and polystyrene was used as a standard material to calculate the weight average molecular weight (Mw) and the number average molecular weight (Mn).

(2) Glass Transition Temperature (Tg, ° C.)

After a sample was melted and quenched, its glass transition temperature was measured by using a differential scanning calorimeter (TA Instruments) while increasing the temperature of the sample at a rate of 10° C./minute. The Tg was determined as a mid value of each tangent line and a base line of an endothermic curve.

(3) Melting temperature (Tm, ° C.) After a sample was melted and quenched, its melting temperature was measured by using a differential scanning calorimeter (TA Instruments), while increasing the temperature of the sample at a rate of 10° C./minute. The Tm was determined as a maximum temperature value of an endothermic melting peak of the crystal.

EXAMPLES

Examples 1 and 2 and Comparative Examples 1 and 2: Preparation of Polylactic Acid Resin Compositions Resins A, B, and C, and/or the talc were mixed in an amount (wt %) listed in the following Table 2 and compounded at 200° C. in a twin-screw extruder (Toshiba-machine) to prepare polylactic acid resin compositions.

EXPERIMENTAL EXAMPLES

The polylactic acid resin compositions prepared in the examples and comparative examples were respectively introduced into an injection molding machine (Victory 80, Engel), and injection molded articles were then crystallized at 110° C. to prepare samples. In this case, the samples were prepared to have different sizes in accordance with the following measurement standards. Also, the time, required for each injection molded article to be automatically injected, was determined as a cooling time.

(1) Tensile Strength ($Kgf/Cm^2$) Measurement

Tensile strength of each sample was measured according to ASTM D638 by using a universal testing machine (UTM, INSTRON). An average value of 5 tests was shown as a resultant value.

(2) Tensile Elongation (%) Measurement

Tensile elongation of each sample was measured according to ASTM D638 by using a universal testing machine (UTM, INSTRON). An average value of 5 tests was shown as a resultant value.

(3) Impact Strength (J/m) Measurement

After the samples having a thickness of ⅛ inch were notched, the notched Izod impact strength of each sample was measured at room temperature (23° C.) according to ASTM D256.

(4) Heat Deformation Temperature (HDT, ° C.) Measurement

Heat deformation temperature of each sample was measured according to ASTM D648. The results thereof are presented in Table 2 below.

TABLE 1

| | Composition (wt %) | | | Physical properties | | | |
|---|---|---|---|---|---|---|---|
| Item | Flexible component (soft segment) | L-lactide | D-lactide | Tg | Tm | Mn | Mw |
| Resin A (flexible PLA) | 10 | 90 | — | 43 | 168 | 110,000 | 210,000 |
| Resin B (general PLLA) | — | 100 | — | 60 | 178 | 100,000 | 190,000 |
| Resin C (first nucleating agent: PDLA) | — | — | 100 | 60 | 178 | 80,000 | 170,000 |

TABLE 2

| Category | | Example 1 | Example 2 | Comparative Example 1 | Comparative Example 2 |
|---|---|---|---|---|---|
| Composition (wt %) | Resin A (flexible PLA) | 85 | 90 | — | — |
| | Resin B (general PLLA) | — | — | 85 | 90 |
| | Resin C (first nucleating agent, PDLA) | 5 | 5 | 5 | 5 |
| | Talc (second nucleating agent) | 10 | 5 | 10 | 5 |
| Mold conditions | Temperature (° C.) | 110 | 110 | 110 | 110 |
| | Cooling time (sec) | 30 | 35 | 35 | 40 |
| Physical properties | Tensile strength (kgf/cm$^2$) | 430 | 370 | 400 | 325 |
| | Tensile elongation (%) | 20 | 22 | 5 | 5 |
| | Impact strength (J/m) | 35 | 50 | 32 | 36 |
| | HDT (° C.) | 125 | 110 | 75 | 64 |

Referring to the results of Table 2, with respect to Examples 1 and 2 which include the flexible PLA resin, it may be confirmed that the cooling time during the injection molding was decreased even when a small amount of PDLA, as the nucleating agent, was added. Also, it was confirmed that, since values of the tensile strength, elongation, impact strength, and HDT were improved, mechanical properties and heat resistance characteristics were significantly improved. In contrast, with respect to Comparative Examples 1 and 2 which include the general PLA resin (general PLLA resin), it was confirmed that the cooling time was longer than that of the example, and that both the mechanical properties and the heat resistance characteristics were poor.

REFERENCE EXAMPLES

Reference Examples 1 to 4: Preparation of Polylactic Acid Resin Mixtures

Resins A, B, and/or C were mixed in an amount (wt %) listed in the following Table 3 (with respect to Reference Example 3, polyethylene glycol (PEG) was further added as a plasticizer) and compounded at 200° C. in a twin-screw extruder (Toshiba-machine) to prepare polylactic acid resin mixtures.

REFERENCE EXPERIMENTAL EXAMPLES

The polylactic acid resin mixtures prepared in the reference examples were respectively introduced into an injection molding machine (Victory 80, Engel), and injection molded articles were then crystallized at 110° C. to prepare samples. In this case, the samples were prepared to have different sizes in accordance with the following measurement standards. Also, the time, required for each injection molded article to be automatically injected, was determined as a cooling time.

(1) Measurement of Crystallization Half Time

Crystallization half time was measured for the polylactic acid resin mixtures prepared in Reference Examples 1 to 4 by differential scanning calorimetry (DSC). Specifically, each polylactic acid resin mixture was melted at a temperature above the melting temperature (Tm). Thereafter, each mixture was quenched at 100° C., 110° C., 120° C., and 130° C., an intermediate value (inflection point) between the start and end of a crystallization peak was then obtained while the temperature was isothermally maintained at each temperature, and the intermediate value (inflection point) was defined as the crystallization half time.

(2) Measurement of Heat Deformation Temperature (HDT, ° C.)

Heat deformation temperature of each sample was measured according to ASTM D648.

(3) Evaluation of Bleed-Out

After the samples were stored in a hot air oven at 80° C. for 24 hours, bleed-out of the plasticizer was evaluated. When stickiness was observed on the surface of the sample, it was represented by "x," and when the stickiness was not observed, it was represented by "○."

(4) Evaluation of Injection Moldability

Crystallization rates were compared by checking cooling time for automatic injection (represented by "A") and cooling time for semi-automatic injection (represented by "½") when the tensile samples were injection molded by introducing the polylactic acid resin mixtures prepared in Reference Examples 1 to 4 into the injection molding machine and then crystallizing the injection molded articles at 110° C. In this case, a blank indicates injection failure.

The measured results are presented in the following Tables 3 and 4, respectively.

TABLE 3

| Category | | Reference Example 1 | Reference Example 2 | Reference Example 3 | Reference Example 4 |
|---|---|---|---|---|---|
| Test items | | Resin A/Resin C (flexible PLA/PDLA) 95/5 (%) | Resin A/Resin C (flexible PLA/PDLA) 97.5/2.5 (%) | Resin B/Resin C (general PLA/PDLA) 95/5 (%) | Resin B/Resin C/plasticizer (general PLA/PDLA/PEG) 85/5/10 (%) |
| Reference Experimental Example (1) | 130° C. | 2.39 min | 3.82 min | 5.14 min | 3.42 min |
| | 120° C. | 1.26 min | 2.58 min | 4.18 min | 2.78 min |
| | 110° C. | 0.94 min | 1.47 min | 2.67 min | 1.98 min |
| | 100° C. | 0.90 min | 1.40 min | 2.44 min | 1.85 min |

TABLE 3-continued

| Category | | Reference Example 1 | Reference Example 2 | Reference Example 3 | Reference Example 4 |
|---|---|---|---|---|---|
| Reference Experimental Example (2) | Mold temperature | 110° C. | 110° C. | 110° C. | 110° C. |
| | Cooling time | 30 sec | 30 sec | 60 sec | 30 sec |
| | HDT | 103° C. | 87° C. | 68° C. | 95° C. |
| Reference Experimental Example (3) | Bleed-out | X | X | X | ○ |

TABLE 4

| Reference Experimental Example (4) | Injection moldability comparison | | | | | | | | | | | |
|---|---|---|---|---|---|---|---|---|---|---|---|---|
| Cooling time (sec) | 180 | 170 | 160 | 150 | 90 | 80 | 70 | 60 | 50 | 40 | 30 | 25 |
| Reference Example 1 | A | A | A | A | A | A | A | A | A | A | A | ½ |
| Reference Example 2 | A | A | A | A | A | A | A | A | A | ½ | — | — |
| Reference Example 3 | A | A | A | A | A | A | A | ½ | — | — | — | — |
| Reference Example 4 | A | A | A | A | A | A | A | A | A | ½ | — |

Referring to the results of Tables 3 and 4, it was confirmed that the crystallization rate was increased, and the HDT value was improved as the amount of the PDLA as the nucleating agent was increased.

Specifically, it was confirmed that the crystallization rate of the polylactic acid resin including the flexible PLA (Reference Example 1) was increased by 2 to 3 times as compared with the polylactic acid resin including the general PLA (Reference Example 3), even when the PDLA was added in a small amount of 5%. Also, it was confirmed that the HDT value of Reference Example 1 was greater than those of the polylactic acid resins including the general PLA (Reference Examples 3 and 4). In particular, the HDT value of Reference Example 4 was slightly increased by further including the plasticizer (PEG), but, since the HDT value of Reference Example 4 was smaller than the HDT value of Reference Example 1, it may be understood that heat resistance characteristics were worse than those of Reference Example 1. Also, the bleed-out of the plasticizer was identified with visual observation.

The invention claimed is:

1. A polylactic acid resin composition comprising:
a polylactic acid resin which includes a hard segment including a polylactic acid repeating unit of the following Formula 1, and a soft segment including a polyurethane polyol repeating unit in which polyether-based polyol repeating units of the following Formula 2 are linearly linked via a urethane bond;
a poly-D-lactic acid (PDLA) resin as a nucleating agent; and
talc:

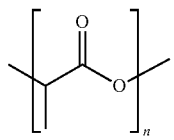

[Formula 1]

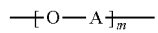

[Formula 2]

wherein, in Formula 1, n is an integer of 700 to 5,000; and
in Formula 2, A is a linear or branched alkylene group having 2 to 5 carbon atoms, and m is an integer of 10 to 100;
wherein the polylactic acid resin composition has a heat deformation temperature (HDT) of 100° C. or more; and
wherein the polylactic acid resin is a block copolymer in which a terminal carboxyl group of the polylactic acid repeating unit included in the hard segment and a terminal hydroxyl group of the polyurethane polyol repeating unit are linked via an ester bond.

2. The polylactic acid resin composition of claim 1, wherein the polylactic acid resin composition comprises 60 wt % to 95 wt % of the polylactic acid resin, 1 wt % to 20 wt % of the poly-D-lactic acid resin, and 1 wt % to 20 wt % of the talc.

3. The polylactic acid resin composition of claim 2, wherein the polylactic acid resin composition comprises 80 wt % to 95 wt % of the polylactic acid resin, 1 wt % to 10 wt % of the poly-D-lactic acid resin, and 1 wt % to 15 wt % of the talc.

4. The polylactic acid resin composition of claim 1, wherein the polylactic acid resin has a number-average molecular weight of 50,000 to 200,000 and a weight-average molecular weight of 100,000 to 400,000.

5. The polylactic acid resin composition of claim 1, wherein the polylactic acid resin has a glass transition temperature (Tg) of 20° C. to 80° C. and a melting temperature (Tm) of 150° C. to 180° C.

6. The polylactic acid resin composition of claim 1, wherein the polylactic acid resin comprises 65 wt % to 95 wt % of the hard segment and 5 wt % to 35 wt % of the soft segment.

7. The polylactic acid resin composition of claim 1, wherein the polylactic acid repeating unit is a poly-L-lactic acid repeating unit.

8. The polylactic acid resin composition of claim 1, wherein the polyurethane polyol repeating units are linearly linked via a urethane bond which is formed by a reaction of a terminal hydroxyl group of the polyether-based polyol repeating unit with an isocyanate group of a diisocyanate compound.

9. The polylactic acid resin composition of claim 8, wherein a reaction molar ratio of the terminal hydroxyl group of the polyether-based polyol repeating unit to the isocyanate group of the diisocyanate compound is in a range of 1:0.50 to 1:0.99.

10. The polylactic acid resin composition of claim 1, wherein the poly-D-lactic acid resin has a weight-average molecular weight of 100,000 to 400,000.

11. A molded product comprising the polylactic acid resin composition of claim 1.

12. The molded product of claim 11, wherein the molded product is automatically injection molded by being cooled at a temperature of 100° C. to 150° C. for 10 seconds to 35 seconds.

13. The molded product of claim 11, wherein the molded product has a heat deformation temperature of 100° C. to 150° C.

* * * * *